United States Patent [19]

Eberle et al.

[11] Patent Number: 4,644,666
[45] Date of Patent: Feb. 24, 1987

[54] APPARATUS FOR DRYING A MOIST MATERIAL BY AIR HEATED BY A HEAT PUMP

[75] Inventors: Heini Eberle, Oberuzwil; Josef Huber, Siebnen, both of Switzerland

[73] Assignee: Getag AG, Jona/Kempraten, Switzerland

[21] Appl. No.: 753,139

[22] Filed: Jul. 9, 1985

[30] Foreign Application Priority Data

Jul. 9, 1984 [CH] Switzerland .......................... 3334/84

[51] Int. Cl.[4] .............................................. F26B 9/06
[52] U.S. Cl. .......................................... 34/34; 34/35; 34/77; 34/86; 34/54
[58] Field of Search ................... 34/77, 86, 35, 30, 27, 34/54, 34

[56] References Cited

U.S. PATENT DOCUMENTS

| | | | |
|---|---|---|---|
| 1,119,011 | 12/1914 | Grosvenor | 34/77 |
| 4,205,456 | 6/1980 | Ayer et al. | 34/86 |
| 4,337,584 | 7/1982 | Johnson | 34/77 |

*Primary Examiner*—Larry I. Schwartz
*Attorney, Agent, or Firm*—Werner W. Kleeman

[57] ABSTRACT

In the method for drying moist agricultural products, the relative humidity of fresh air inducted from the environment is reduced by heating it so that the fresh air can take up moisture from the products to be dried. A portion of the thermal energy contained in the moist exhaust air is extracted by the evaporator of a heat pump before the moist exhaust air exits to the environment. At temperature below 10° C. a portion of the moist exhaust air is mixed with the cold fresh air before being heated by the condenser of the heat pump.

5 Claims, 2 Drawing Figures

APPARATUS FOR DRYING A MOIST MATERIAL BY AIR HEATED BY A HEAT PUMP

BACKGROUND OF THE INVENTION

The present invention broadly relates to organic desiccation and, more specifically, pertains to a new and improved method and apparatus for drying a moist material, especially an agricultural product.

Generally speaking, the method of the present invention is for drying a moist material by means of air heated by the condenser of a heat pump and subsequently blown through the material being dried by a blower.

In other words, the method of the present invention comprises the steps of inducting fresh air from the ambient natural atmosphere; conducting the inducted fresh air through a condenser of an air-to-air heat pump for heating the fresh air; blowing the heated fresh air through a bin or drying chamber containing the moist material for drying the moist material; and conducting a first portion of exhaust air exiting from the bin or drying chamber containing the moist material through an evaporator of the air-to-air heat pump for recuperating thermal energy.

The apparatus of the present invention comprises a bin or drying chamber for accommodating the material to be dried; an induction duct communicating with the ambient natural atmosphere and with the bin or drying chamber; a blower disposed within the induction duct for conducting fresh air into the bin or drying chamber; an exhaust duct for exhausting used or exhaust air from the bin and communicating with the ambient natural atmosphere and with an upper region of the bin or drying chamber and having an end adjacent the ambient natural atmosphere; an air-to-air heat pump having a condenser and an evaporator; and the condenser being arranged within the induction duct.

In other words, the apparatus of the present invention comprises at least one drying chamber for accommodating the material to be dried and having an inlet end for drying air and an outlet end for exhaust air; an induction duct for the drying air communicating with the ambient natural atmosphere and with the inlet end of the at least one drying chamber; a blower cooperating with the induction duct for inducting the drying air from the ambient natural atmosphere and blowing the drying air into the inlet end of the at least one drying chamber; an exhaust duct for the exhaust air communicating with the outlet end of the at least one drying chamber and having an end exposed to the ambient natural atmosphere; an air-to-air heat pump having a condenser and an evaporator; the condenser having an induction side and being arranged within the induction duct; and the evaporator being arranged at the exposed end of the exhaust duct such that exhaust air passing through the evaporator accedes or is discharged to the ambient natural atmosphere.

Methods for drying grass and apparatus for performing such methods are known.

In a known apparatus the moist exhaust air from the material being dried is conducted in a closed circuit into the region of a cold evaporator of a heat pump and there cooled such that a portion of its moisture is extracted as condensate. The cold and now drier air now flows further into the region of a warm condenser of the heat pump and is heated. The warm and dry air coming from the condenser is blown through the material being dried by a fan, usually a conventional ventilating blower, and extracts moisture therefrom. Circulation then begins anew.

Apparatus of this type have the disadvantage that as the ambient temperature rises, for instance in the afternoon, its thermal content cannot be significantly exploited and consequently all energy requirements must be supplied by the heat pump. There is furthermore the danger that ice will form on the evaporator at low ambient temperatures, for instance below 12° C., which reduces the efficiency of the heat pump.

SUMMARY OF THE INVENTION

Therefore, with the foregoing in mind, it is a primary object of the present invention to provide a new and improved method and apparatus for drying a moist material which does not exhibit the aforementioned drawbacks and shortcomings of the prior art constructions.

Another and more specific object of the present invention aims at providing a new and improved method and apparatus of the previously mentioned type for drying a moist material, especially an agricultural product, in which exhaust air is recirculated when ambient temperatures are low for conserving thermal energy and for preventing the formation of ice on the condenser.

Yet a further significant object of the present invention aims at providing a new and improved construction of an apparatus of the character described for drying a moist material and which apparatus is relatively simple in construction and design, extremely economical to manufacture, highly reliable in operation, not readily subject to breakdown and malfunction and requires a minimum of maintenance and servicing.

Now in order to implement these and still further objects of the invention, which will become more readily apparent as the description proceeds, the method of the present invention is manifested by the features that it comprises the steps of conducting fresh air inducted from the atmosphere through the condenser of the heat pump and thereby heating the fresh air, the heat pump comprising an air-to-air heat pump and conducting used or exhaust air exiting from the material being dried through an evaporator of the heat pump before the used or exhaust air is discharged to the atmosphere.

According to a further specific embodiment, the method of the present invention comprises the steps of subsequently discharging the first portion of the used air to the ambient natural atmosphere, and recirculating a second portion of the used or exhaust air to the condenser when the ambient natural atmosphere has a temperature below a predetermined value for conserving thermal energy.

The apparatus of the present invention is manifested by the features that the evaporator is arranged at the end of the exhaust duct such that all of the used or exhaust air passing through the evaporator exhausts to the ambient natural atmosphere.

According to a further specific embodiment, the apparatus of the present invention is manifested by the features that the induction duct has a region lying on the induction side of the condenser and adjustable damper means are provided which interconnect the exhaust duct with the region of the induction duct such that an adjustable portion of the used or exhaust air can be recirculated through the condenser and the at least one drying chamber.

With the inventive method the drying capacity can be increased by 30% to 100% in comparison to known methods, i.e. by 30% in cold and rainy weather and by 100% in fair weather.

By mixing warm exhaust air with the inducted fresh air the efficiency of drying in cold weather can be effectively increased.

In contradistinction to known apparatus, in which the relative humidity of the air within the circuit must be continuously monitored in order to prevent icing up of the evaporator or even moistening of the material to be dried, no means for monitoring or controlling moisture are required in the inventive apparatus.

Even at high relative humidity (rainy weather), the relative humidity of the inducted fresh air is reduced by heating it to such an extent that drying by moisture extraction is always possible. The air further saturated by the moist material is discharged to the environment after the thermal energy contained therein has been extracted.

BRIEF DESCRIPTION OF THE DRAWINGS

The invention will be better understood and objects other than those set forth above, will become apparent when consideration is given to the following detailed description thereof. Such description makes reference to the annexed drawings wherein throughout the various figures of the drawings there have been generally used the same reference characters to denote the same or analogous components and wherein.

DETAILED DESCRIPTION OF THE PREFERRED EMBODIMENTS

Figure 1:
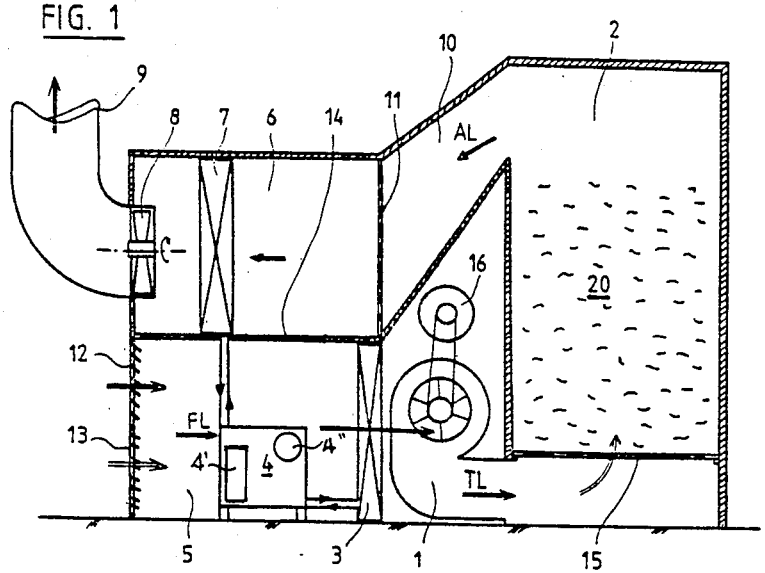
FIG. 1 schematically shows a drying apparatus in normal operation.
Figure 2:
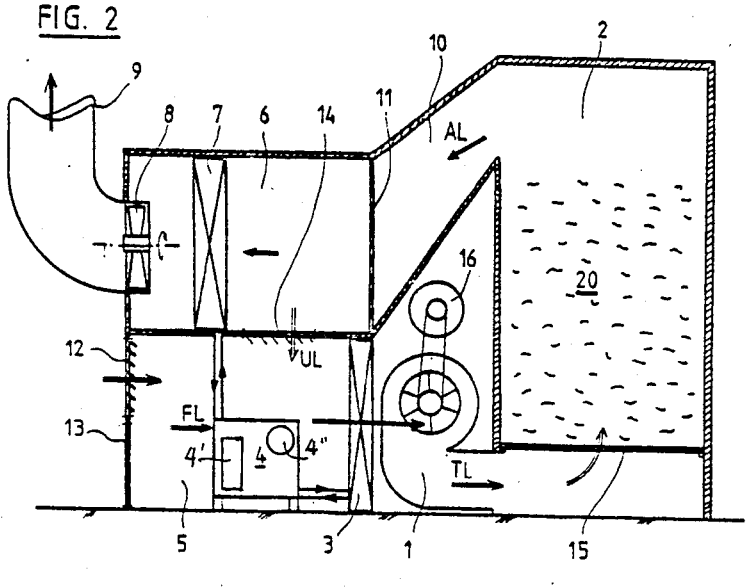
FIG. 2 schematically shows the drying apparatus of FIG. 1 in recirculating operation.

Describing now the drawings, it has to be understood that to simplify the showing thereof only enough of the structure of the apparatus for drying moist material has been illustrated therein as is needed to enable one skilled in the art to readily understand the underlying principles and concepts of this invention. Turning now specifically to FIG. 1 of the drawings, the apparatus illustrated therein by way of example and not limitation and employed to realize the method as hereinbefore described will be seen to comprise a blower 1 arranged on an induction side of the apparatus. The blower 1 blows air into a bin or drying chamber 2 filled with an agricultural product or moist material 20, for instance wilted grass or corn. A condenser 3, a compressor 4' and a drive motor 4" of an air-to-air heat pump 4 are installed in an induction duct 5 communicating with the inlet or induction side of the blower 1. An evaporator 7 of the heat pump 4 is arranged in a second duct or exhaust duct 6 which, in the present example, is arranged above the induction duct 5. The exhaust duct 6 communicates with the outlet or exhaust side of the bin or drying chamber 2 and at this location receives from 40% to 60% of the used or exhaust air exhausting or exiting from the material 20 being dried. As seen in the direction of flow of the exhaust air, a suction blower 8 is arranged subsequent to the evaporator 7 and is connected with an outlet duct 9 leading to the environment. A filter 11 for protecting the evaporator 7 from contamination may be arranged ahead of the evaporator 7, i.e. at the end of a duct 10 connecting the bin or drying chamber 2 and the exhaust duct 6.

Adjustable air flaps or dampers 12, 13 and 14 are installed both on the induction side of the induction duct 5 and between the induction duct 5 and the exhaust duct 6. The flaps or dampers 14 are arranged between the evaporator 7 and the filter 11. A grill or grate 15 forms the lower closure of the bin or drying chamber 2. The drying air emanating from the blower 1 can be uniformly introduced into the material 20 being dried through the grate 15.

An electric motor 16 can be employed as a drive unit for the blower 1. As an alternative, both the blower 1 and the heat pump 4 can be commonly driven by a not particularly shown conventional diesel engine, whose rejected heat can be introduced into the fresh air flowing through the dampers 12 and 13 into the induction duct 5 by means of a not particularly shown conventional heat exchanger.

In operation fresh air having a relative humidity of, for example, 92% is inducted from the environment through the dampers 12 and 13 into the induction duct 5 and heated both by the rejected heat of the compressor 4 and by the condenser 3. The air heated up, for instance by 5° C. to 8° C. for hay or by 25° C. to 30° C. for corn, now has a relative humidity of approximately 40% and is introduced into the material 20 to be dried by the blower 1 located in the induction duct 5. When the air exits from the material 20 being dried at the upper end of the bin or drying chamber 2, the relative humidity has increased to 90% to 100% and the temperature can have dropped by 6° C. or 7° C. The heat exchanger of the evaporator 7 extracts a portion of the thermal energy from the moist and possibly cooled air and subsequently discharges the cooled air through the outlet duct 9 to the environment.

This energy absorbed in the evaporator 7 is transported to the condenser 3 as thermal energy in the drying air flowing through the system.

In the embodiment according to FIG. 1, the entire volume of used or exhaust air is discharged to the environment after at least half of it has been conducted through the evaporator 7. This constitutes operation of the apparatus under normal conditions where the ambient temperature is greater than 10° C. It will be understood that a portion of the air escapes by leakage through the walls of the bin or drying chamber 2. If the operating conditions change, e.g. the temperature of the inducted fresh drying air drops below 10° C., then a portion of the used or exhaust air is conducted directly back to the condenser 3 as recirculation air by opening the damper 14 and closing the damper 13. The quantity of air being exhausted through the evaporator 7 into the environment is not altered by this operation since a greater portion of used or exhaust air is taken out of the material 20 being dried.

While there are shown and described present preferred embodiments of the invention, it is to be distinctly understood that the invention is not limited thereto, but may be otherwise variously embodied and practiced within the scope of the following claims. Accordingly,

What we claim is:

1. An apparatus for drying a moist material, especially an agricultural product, comprising:
   a bin for accommodating the material to be dried;
   an induction duct communicating with the ambient natural atmosphere and with said bin;

a blower disposed within said induction duct for conducting fresh air into said bin;

an exhaust duct for exhausting used air from said bin and communicating with the ambient natural atmosphere and with said bin and having an end adjacent the ambient natural atmosphere;

a heat pump having a condenser and an evaporator;

said condenser being arranged within said induction duct;

said evaporator being arranged at said end of said exhaust duct such that any predetermined quantity of said used air passing through said evaporator exhausts to the ambient natural atmosphere;

an adjustable damper mounted in said exhaust duct between said bin and said evaporator;

said condenser having an induction side;

said exhaust duct having a region lying on said induction side of said condenser; and said adjustable damper operatively interconnecting said induction duct and said region of said exhaust duct.

2. The apparatus as defined in claim 1, wherein:
said exhaust duct is arranged above said induction duct.

3. An apparatus for drying a moist material, comprising:
at least one drying chamber for accommodating the material to be dried and having an inlet end for drying air and an outlet end for exhaust air;

an induction duct for said drying air communicating with the ambient natural atmosphere and with said inlet end of said at least one drying chamber;

a blower cooperating with said induction duct for inducting said drying air from the ambient natural atmosphere and blowing said drying air into said inlet end of said at least one drying chamber;

an exhaust duct for said exhaust air and communicating with said outlet end of said drying chamber and having an end exposed to the ambient natural atmosphere;

an air-to-air heat pump having a condenser and an evaporator;

said condenser having an induction side and being arranged within said induction duct;

said evaporator being arranged at said exposed end of said exhaust duct such that exhaust air passing through said evaporator is discharged to the ambient natural atmosphere;

said induction duct having a region lying on said induction side of said condenser; and adjustable damper means interconnecting said exhaust duct with said region of said induction duct such that an adjustable portion of said exhaust air can be recirculated through said condenser and said at least one drying chamber.

4. The apparatus as defined in claim 3, further including:
a further blower cooperating with said exhaust duct for exhausting a predeterminate amount of said exhaust air through said evaporator to the ambient natural amosphere and for constraining a remainder thereof to selectively either exit directly to the ambient natural atmosphere or to enter said adjustable damper means for recirculation; and said at least one drying bin not being air-tightly sealed.

5. A method of drying moist material, comprising the steps of:
inducting fresh air from the ambient natural atmosphere;

conducting said inducted fresh air through a condenser of an air-to-air heat pump for heating said fresh air;

employing first blower means to blow said heated fresh air through a chamber containing the moist material for drying the moist material;

employing second blower means to conduct a first portion of used air exiting from said chamber containing the moist material through an evaporator of said air-to-air heat pump for recuperating thermal energy;

employing said second blower means to subsequently discharge said first portion of said used air to the ambient natural atmosphere; and further employing said second blower means to selectively either constrain a second portion of said used air exiting from said chamber to a exit to the ambient natural atmosphere through leakage or to enter recirculation means for recirculating said second portion of said used air exiting from said chamber directly to said condenser when said ambient natural atmosphere has a temperature below a predetermined value for conserving thermal energy.

* * * * *